(12) United States Patent
Schroeder

(10) Patent No.: US 12,030,723 B2
(45) Date of Patent: Jul. 9, 2024

(54) IMPACT ABSORBING CONVEYOR BELT

(71) Applicant: ContiTech Transportbandsysteme GmbH, Hannover (DE)

(72) Inventor: Michael B. Schroeder, Wahpeton, ND (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 85 days.

(21) Appl. No.: 17/503,696

(22) Filed: Oct. 18, 2021

(65) Prior Publication Data
US 2022/0135334 A1  May 5, 2022

Related U.S. Application Data

(60) Provisional application No. 63/109,359, filed on Nov. 4, 2020.

(51) Int. Cl.
*B65G 15/30* (2006.01)
*B65G 15/34* (2006.01)

(52) U.S. Cl.
CPC ..................... *B65G 15/30* (2013.01)

(58) Field of Classification Search
CPC ................. B65G 15/30; B65G 15/34
See application file for complete search history.

(56) References Cited

U.S. PATENT DOCUMENTS

| | | |
|---|---|---|
| 2,252,836 A | 8/1941 | Curry et al. |
| 4,567,088 A | 1/1986 | Skogman et al. |
| 5,164,241 A * | 11/1992 | Andre De La Porte ............ D03D 27/10 428/116 |
| 6,092,645 A * | 7/2000 | Wahren ............... B65G 15/34 198/821 |
| 2014/0061008 A1* | 3/2014 | Haythornthwaite ... B65G 15/34 264/255 |
| 2015/0291359 A1* | 10/2015 | Tajima ................. B65G 15/34 198/689.1 |

(Continued)

FOREIGN PATENT DOCUMENTS

| | | | |
|---|---|---|---|
| AU | 2013258262 A1 | 12/2014 | |
| CN | 109368122 A | 2/2019 | |
| CN | 109318554 B * | 4/2023 | ............. B32B 25/10 |

(Continued)

OTHER PUBLICATIONS

GB815910A (Year: 1959).*

(Continued)

*Primary Examiner* — Gene O Crawford
*Assistant Examiner* — Lester Rushin, III
(74) *Attorney, Agent, or Firm* — Gregory J. Adams; Richard A. Wolf

(57) ABSTRACT

An impact absorbing conveyor belt that includes an impact absorption layer, a first fabric layer and a top cover layer. The impact absorption layer has a first side. The impact absorption layer has a durometer. When the conveyor belt is in use, the first side of the impact absorption layer is oriented toward a surface of the conveyor belt on which an object being conveyed is placed. The top cover layer has a durometer that is greater than the durometer of the impact absorption layer. The first fabric layer and the top cover layer are both positioned on the first side of the impact absorption layer.

18 Claims, 2 Drawing Sheets

(56) References Cited

U.S. PATENT DOCUMENTS

2021/0246966 A1\* 8/2021 Schaper ................ A01D 61/02

FOREIGN PATENT DOCUMENTS

| EP | 0142716 B1 | | 3/1989 |
|---|---|---|---|
| GB | 815910 A | \* | 7/1959 |
| GB | 815910 A | | 7/1959 |

OTHER PUBLICATIONS

CN109318554 (Year: 2023).\*
International Search Report dated Apr. 4, 2022 of counterpart EP application 21205504.0.

\* cited by examiner

IMPACT ABSORBING CONVEYOR BELT

REFERENCE TO RELATED APPLICATION

This application claims priority to Provisional Applic. No. 63/109,359, filed on Nov. 4, 2020, the contents of which are incorporated herein by reference.

FIELD OF THE INVENTION

The invention relates generally to conveyor belts. More particularly, the invention relates to impact absorbing conveyor belts.

BACKGROUND OF THE INVENTION

While conveyor belts provide an efficient mechanism to move products, certain products exhibit characteristics that have a tendency to damage the conveyor belts. Examples of such characteristics are dense and sharp edges. When the conveyor belts become damaged, there can be significant expense to replace the damaged components of the conveyor belt. There can also be significant loss of productivity associated when the conveyor belt is being repaired. None of the prior art conveyor belts adequately address these issues.

Prior art conveyor belts attempt to reduce the potential of rips and gouges by using specialized fabric to create load deflection. In situations where it is not possible for load deflection because of the presence of conveyor pans under the belt, the specialized fabric has no effect. The repeated impacts from the objects being deposited onto the conveyor belt begins to deteriorate the top cover and such deterioration leads to exposure of the conveyor belt carcass and eventually failure of the conveyor, which necessitates replacement of the conveyor belt.

SUMMARY OF THE INVENTION

An embodiment of the invention is directed to an impact absorbing conveyor belt that includes an impact absorption layer, a first fabric layer and a top cover layer. The impact absorption layer has a first side. The impact absorption layer has a durometer. When the conveyor belt is in use, the first side of the impact absorption layer is oriented toward a surface of the conveyor belt on which an object being conveyed is placed. The top cover layer has a durometer that is greater than the durometer of the impact absorption layer. The first fabric layer and the top cover layer are both positioned on the first side of the impact absorption layer.

Another embodiment of the invention is directed to a method of fabricating an impact absorbing conveyor belt. An impact absorption layer having a first side is provided. The impact absorption layer has a durometer. When the conveyor belt is in use, the first side of the impact absorption layer is oriented toward a surface of the conveyor belt on which an object being conveyed is placed. A first fabric layer is provided. A top cover layer having a durometer, which is greater than the durometer of the impact absorption layer, is provided. The first fabric layer and the top cover layer are positioned on the first side of the impact absorption layer.

Another embodiment of the invention is directed to a method of using an impact absorbing conveyor belt. A conveyor belt is provided that includes an impact absorption layer, a first fabric layer and a top cover layer. The impact absorption layer has a has a first side. The first fabric layer and the top cover layer are both positioned on the first side of the impact absorption layer. The impact absorption layer has a durometer that is less than a durometer of the top cover layer. An object is placed on a side the conveyor belt that is oriented towards the first side of the impact absorption layer causes at least a portion of the impact absorption layer to compress to dissipate the force from the object being placed on the conveyor belt.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
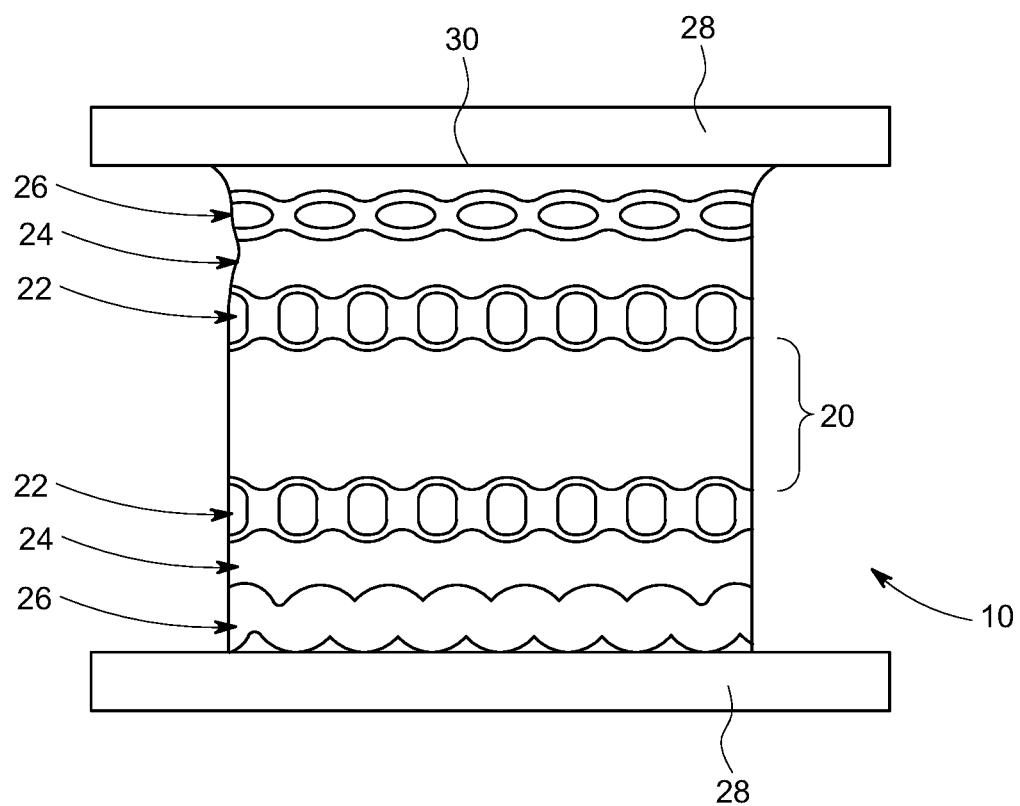
FIG. 1 is a sectional view of an impact absorbing conveyor belt according to an embodiment of the invention where the impact absorbing conveyor belt is in an initial uncompressed configuration.
Figure 2:
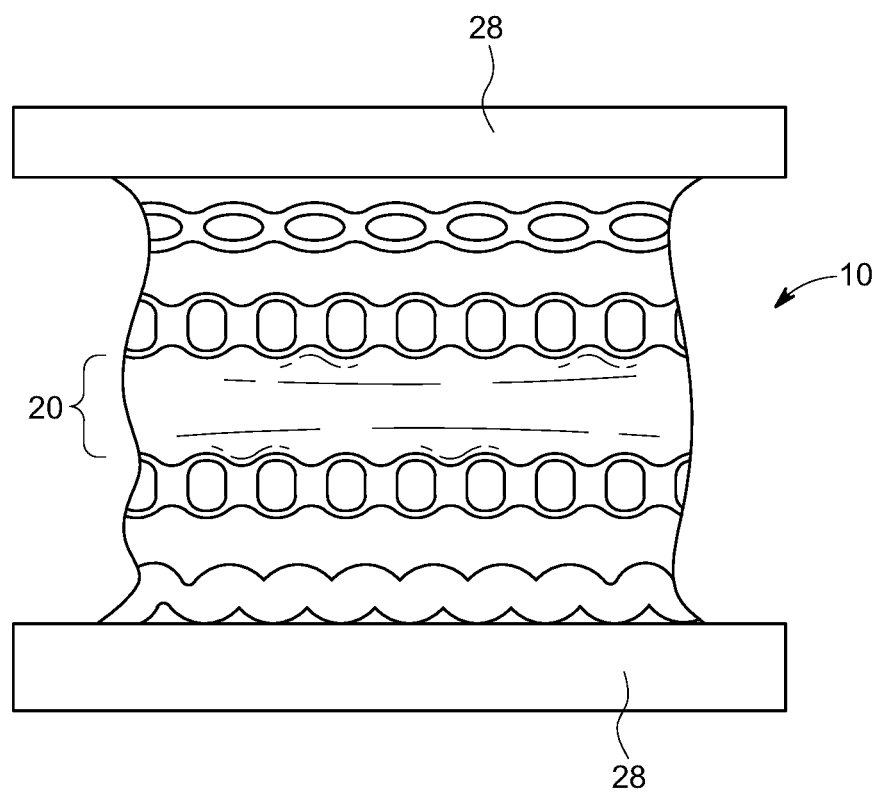
FIG. 2 is a sectional view of the impact absorbing conveyor belt in a compressed configuration.

An embodiment of the invention is directed to an impact absorption conveyor belt as illustrated at 10 in FIGS. 1 and 2. Other than an impact absorption layer 20, the conveyor belt 10 may be configured similar to other conventional conveyor belts.

The conveyor belt 10 of this invention includes the impact absorption layer 20 that absorbs impacts imparted on to the conveyor belt 10 as objects are deposited onto the conveyor belt 10. The impact absorption layer 20 dissipates the force of the impact across the conveyor belt 10 by absorbing the impact into the carcass of the conveyor belt 10. Through such a process, the potential of the objects ripping and/or gouging the conveyor belt 10 is significantly reduced as compared to conveyor belts that do not include the impact absorption layer.

A variety of materials may be used for the impact absorption layer 20. A first criteria for selection the materials used in fabricating the impact absorption layer 20 is that the material be compressible in response to a force placed thereon.

In this regard, the material used in the impact absorption layer 20 should have a durometer that is less than a durometer of the material that is used to fabricate the top cover. For example, a rubber type material may be used in fabricating the impact absorption layer 20. Examples of two suitable rubber materials are styrene-butadiene rubber and natural rubber.

Another criterion for selecting the materials used in fabricating the impact absorption layer 20 is that the material is suitable for being vulcanized in conjunction with the process of fabricating the conveyor belt 10.

A thickness of the impact absorption layer 20 may be selected based upon a variety of factors such as the nature of the items that are being deposited onto the conveyor belt 10. For example, the greater the impact of the objects being deposited onto the conveyor belt 10, the thicker and/or more compressible the impact absorption layer 20.

In one such configuration, the impact absorption layer 20 has a thickness that is about ⅓ of a total thickness of the conveyor belt 10 and the impact absorption layer 20 is approximately intermediate upper and lower surfaces of the conveyor belt 10.

FIG. 1 illustrates the conveyor belt 10 with the impact absorption layer 20 in an uncompressed configuration and FIG. 2 illustrates the conveyor belt 10 with the impact absorption layer 20 in a compressed configuration. FIGS. 1 and 2 illustrate plates 28 positioned above an upper surface of the conveyor belt 10 and below a lower surface of the conveyor belt 10. These plates 28 are not part of the invention but rather are used to evaluate the compressibility of the impact absorption layer 20.

The force used to compare the absorption properties relates to the durometer (softness) of the material used in fabricating the impact absorption layer 20 and then factoring in the compression gauge change from non-applied load to applied load.

The performance of the conveyor belt 10 of this invention is also evaluated using a plunge drop test that uses a particular set load that is dropped onto the conveyor belt 10 from a controlled distance and the deformation distance is measured. The deformation of the samples is then compared.

In certain embodiments, the impact absorption layer 20 has a compressibility of at least 15 percent meaning that the change in height between the uncompressed height of the impact absorption layer 20 and the compressed height of the impact absorption layer 20 is at least about 15 percent. In other embodiments, the compressibility of the impact absorption layer 20 is greater than about 30 percent.

The amount of compression rate desired can be determined by the impact load of the equipment and/or application. While the invention is particularly suited for use with objects deposited onto the conveyor belt that are likely to damage the conveyor belt, the invention can also be used in conjunction with conveyor belts that are used in conjunction with other applications.

The impact absorption layer 20 allows the conveyor belt 10 to compress at the center and not the top cover 30. By shifting compression from the top cover 30 to the center, the formation of cuts and/or gouges in the top cover 30 is reduced. It is desirable to avoid such cuts and gouges in the top cover 30 because the cuts and gouges eventually lead to tearing of the conveyor belt 10 that exposes the carcass of the conveyor belt 10. Such actions reduce the useful life of the conveyor belt 10.

Reducing cuts and gouges in the top cover 30 of the conveyor belt 10 will extend the useful life of the carcass underneath that will increase the overall useful life of the entire conveyor belt 10 as compared to a conveyor belt that does not include the impact absorption layer.

It has been found that conveyor belt 10 with the impact absorption layer 20 significantly increases the useful life of the conveyor belt 10. In certain embodiment, the conveyor belt 10 with the impact absorption layer 20 has a useful life that is more than 50 percent greater than a conveyor belt without the impact absorption layer. In other embodiments, the conveyor belt 10 with the impact absorption layer 20 has a useful life that is more than 70 percent greater than the conveyor belt without the impact absorption layer.

In certain configurations, the conveyor belt 10 includes a fabric ply 22 is placed along an upper surface of the impact absorption layer 20. A person of skill in the art will appreciate that a variety of materials may be used for the fabric ply 22. These materials are typically classified as spun and filament. Spun fabric is made from staple fibers that are spun to produce the strands, which are then woven to produce the spun fabric. Filament fabric, on the other hand, is formed from continuous extruded filament threads. A variety of factors can affect which type of fabric is used in fabricating a particular conveyor belt.

The type of the fabric ply 22 as well as the thickness of the fabric ply 22 is selected based upon the material that is intended to be transported using the conveyor belt 10 as well as the volume of material that is intended to be transported on the conveyor belt 10.

A rubber layer 24 is placed over the fabric ply 22. While it is possible for the concepts of the invention to be used in conjunction with various rubber compositions, in certain embodiments, the rubber coating contains styrene butadiene rubber as a primary rubber component.

In certain embodiments, another fabric ply 26 is placed over the rubber layer 24. Both of the fabric plies 22, 26 may be fabricated from a similar material. In other embodiments, the fabric plies 22, 26 may be fabricated from different materials. For example, the fabric ply 26 may be fabricated from a material that has enhanced abrasion resistance as compared to the fabric ply 22.

While it is illustrated that the conveyor belt 10 has a symmetric configuration with respect to the layers on the upper and lower surfaces of the impact absorption layer 20, it is possible for other configurations to be used depending on the application in which the conveyor belt 10 is intended to be used.

While it is illustrated that the conveyor belt 10 includes two fabric plies 22, 26 and one rubber layer 24 along the upper and lower surfaces of the impact absorption layer 20, it is possible for other configurations to be used. For example, there may be 3, 4 or more fabric plies along the upper surface and/or the lower surface of the impact absorption layer 20. Between each of the fabric plies there would be a rubber layer.

Once all of the layers of the conveyor belt 10 are placed adjacent to each other, the components are cured together such as using vulcanization. A person of skill in the art will appreciate that the vulcanization conditions may vary depend on the number and size of the components used in fabricating the conveyor belt 10.

Once the conveyor belt 10 fabrication is complete, the conveyor belt 10 is installed and ready for use. During such use, the regions of the conveyor belt 10 that are subjected to force such as when objects are deposited onto the conveyor belt 10 cause the impact absorption layer 20 to be compressed from the uncompressed configuration illustrated in FIG. 1 to the compressed configuration illustrated in FIG. 2. In certain embodiments, the compression is greater than about 15 percent of the thickness of the impact absorption layer 20.

Through such compression of the impact absorption layer 20, the forces are absorbed by the conveyor belt 10. The absorption reduces the potential of damage to the conveyor belt 10 such as the top cover layer 30 and thereby increases the useful life of the conveyor belt 10.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting.

It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. An impact absorbing conveyor belt comprising:
   an impact absorption layer having a first side, wherein the impact absorption layer has a durometer, wherein when the conveyor belt is in use, the first side of the impact absorption layer is oriented toward a surface of the conveyor belt on which an object being conveyed is placed;
   a first fabric layer;
   a top cover layer having a durometer that is greater than the durometer of the impact absorption layer, wherein the first fabric layer and the top cover layer are both positioned on the first side of the impact absorption layer;
   a rubber layer on a surface of the first fabric layer that is opposite the impact absorption layer; and
   a second fabric layer on a surface of the rubber layer that is opposite the first fabric layer, wherein the top cover is on a surface of the second fabric layer that is opposite the rubber layer.

2. The impact absorbing conveyor belt of claim 1, wherein the impact absorption layer has a compressibility of at least 15 percent.

3. The impact absorbing conveyor belt of claim 1, wherein the conveyor belt has a thickness and wherein the impact absorption layer has a thickness of about ⅓ of the conveyor belt thickness.

4. The impact absorbing conveyor belt of claim 1, wherein the first fabric layer is on the first side of the impact absorbing layer and wherein the first top cover is on a surface of the first fabric layer that is opposite the impact absorption layer.

5. An impact absorbing conveyor belt comprising:
   an impact absorption layer having a first side, wherein the impact absorption layer has a durometer, wherein when the conveyor belt is in use, the first side of the impact absorption layer is oriented toward a surface of the conveyor belt on which an object being conveyed is placed;
   a first fabric layer; and
   a top cover layer having a durometer that is greater than the durometer of the impact absorption layer, wherein the first fabric layer and the top cover layer are both positioned on the first side of the impact absorption layer;
   wherein the impact absorption layer further comprises a second side that is opposite the first side and wherein the impact absorbing conveyor belt further comprises:
   a second fabric layer on the side second of the impact absorption layer; and
   a bottom cover layer on a surface of the second fabric layer that is opposite the impact absorption layer.

6. The impact absorbing conveyor belt of claim 1, wherein the top cover layer comprises styrene butadiene rubber and wherein when the first fabric layer comprises at least one of a spun fabric and filament fabric.

7. A method of fabricating an impact absorbing conveyor belt comprising:
   providing an impact absorption layer having a first side, wherein the impact absorption layer has a durometer, wherein when the conveyor belt is in use, the first side of
   the impact absorption layer is oriented toward a surface of the conveyor belt on which an object being conveyed is placed;
   providing a first fabric layer;
   providing a top cover layer having a durometer that is greater than the durometer of the impact absorption layer; and
   positioning the first fabric layer and the top cover layer on the first side of the impact absorption layer;
   positioning a rubber layer on a surface of the first fabric layer that is opposite the impact absorption layer;
   positioning a second fabric layer on a surface of the rubber layer that is opposite the first fabric layer; and
   positioning the top cover is on a surface of the second fabric layer that is opposite the rubber layer.

8. The method of claim 7, wherein the impact absorption layer has a compressibility of at least 15 percent, wherein the conveyor belt has a thickness and wherein the impact absorption layer has a thickness of about ⅓ of the conveyor belt thickness.

9. The method of claim 7, and further comprising:
   positioning the first fabric layer on the first side of the impact absorbing layer; and
   positioning the first top cover on a surface of the first fabric layer that is opposite the impact absorption layer.

10. The method of claim 7, wherein the impact absorption layer further comprises a second side that is opposite the first side and wherein the method further comprises:
    positioning a second fabric layer on the side second of the impact absorption layer; and
    positioning a bottom cover layer on a surface of the second fabric layer that is opposite the impact absorption layer.

11. The method of claim 7, wherein the top cover layer comprises styrene butadiene rubber, wherein when the first fabric layer comprises at least one of a spun fabric and filament fabric and wherein the method further comprises vulcanizing the conveyor belt.

12. A method of using an impact absorbing conveyor belt comprising:
    providing a conveyor belt comprising an impact absorption layer, a first fabric layer and a top cover layer, wherein the impact absorption layer comprises a has a first side, wherein the first fabric layer and the top cover layer are both positioned on the first side of the impact absorption layer and wherein the impact absorption layer has a durometer that is less than a durometer of the first fabric layer and the top cover layer; and
    placing an object on a side the conveyor belt that is oriented towards the first side of the impact absorption layer causes at least a portion of the impact absorption layer to compress to dissipate the force from the object being placed on the conveyor belt.

13. The method of claim 12, wherein the top cover layer does not compress when the object is placed on the conveyor belt.

14. The method of claim 12, wherein the impact absorption layer increases a useful life of the conveyor belt as compared to a useful life of a conveyor belt that does not include the impact absorption layer by greater than about 50 percent.

15. The method of claim 12, wherein the impact absorption layer has a compressibility of at least 15 percent, wherein the conveyor belt has a thickness and wherein the impact absorption layer has a thickness of about ⅓ of the conveyor belt thickness.

16. The method of claim 12, wherein the first fabric layer is on the first side of the impact absorbing layer and wherein the first top cover is on a surface of the first fabric layer that is opposite the impact absorption layer.

17. The method of claim 12, wherein the impact absorption layer further comprises a second side that is opposite the first side and wherein the impact absorbing conveyor belt further comprises:
   a second fabric layer on the side second of the impact absorption layer; and
   a bottom cover layer on a surface of the second fabric layer that is opposite the impact absorption layer.

18. The method of claim 12, and further comprising:
   a rubber layer on a surface of the first fabric layer that is opposite the impact absorption layer; and
   a second fabric layer on a surface of the rubber layer that is opposite the first fabric layer, wherein the top cover is on a surface of the second fabric layer that is opposite the rubber layer.

* * * * *